(12) United States Patent
Miyazoe et al.

(10) Patent No.: US 8,978,701 B2
(45) Date of Patent: Mar. 17, 2015

(54) ENERGY-SAVING VALVE

(75) Inventors: Shinji Miyazoe, Tsukubamirai (JP);
Katsuyuki Senba, Tsukubamirai (JP);
Takashi Murakami, Ibaraki (JP)

(73) Assignee: SMC Corporation, Tokyo (JP)

( * ) Notice: Subject to any disclaimer, the term of this patent is extended or adjusted under 35 U.S.C. 154(b) by 247 days.

(21) Appl. No.: 13/541,061

(22) Filed: Jul. 3, 2012

(65) Prior Publication Data

US 2013/0019958 A1 Jan. 24, 2013

(30) Foreign Application Priority Data

Jul. 22, 2011 (JP) ................................. 2011-160780

(51) Int. Cl.
*F15B 13/043* (2006.01)
*F16K 11/02* (2006.01)
*F16K 11/044* (2006.01)

(52) U.S. Cl.
CPC ............... *F16K 11/02* (2013.01); *F16K 11/044* (2013.01)
USPC ..................... 137/625.64; 137/625.69; 91/446

(58) Field of Classification Search
USPC .............. 137/625.64, 625.66, 625.69; 91/446
See application file for complete search history.

(56) References Cited

U.S. PATENT DOCUMENTS

| 2,891,517 | A | * | 6/1959 | Towler | 91/466 |
| 3,825,033 | A | * | 7/1974 | Hayner | 137/625.66 |
| 4,193,423 | A | * | 3/1980 | Stoll et al. | 137/625.64 |
| 4,719,944 | A | * | 1/1988 | Cleasby | 137/625.64 |
| 5,623,967 | A | * | 4/1997 | Hayashi | 137/625.64 |
| 5,868,157 | A | * | 2/1999 | Yoshimura et al. | 137/625.64 |
| 6,834,661 | B2 | * | 12/2004 | Bento | 137/625.64 |
| 7,118,087 | B2 | | 10/2006 | Miyazoe et al. | |
| 7,252,115 | B2 | | 8/2007 | Miyazoe et al. | |
| 7,252,116 | B2 | | 8/2007 | Miyazoe et al. | |
| 7,677,264 | B2 | | 3/2010 | Miyazoe et al. | |
| 8,613,292 | B2 | * | 12/2013 | Miyazoe et al. | 137/596.14 |
| 2003/0047222 | A1 | * | 3/2003 | Neff et al. | 137/625.64 |
| 2011/0193000 | A1 | * | 8/2011 | Miyazoe et al. | 251/129.01 |

FOREIGN PATENT DOCUMENTS

| JP | 2002-13504 | 1/2002 |
| JP | 2011-163466 | 8/2011 |

* cited by examiner

*Primary Examiner* — John Rivell
(74) *Attorney, Agent, or Firm* — Oblon, Spivak, McClelland, Maier & Neustadt, L.L.P.

(57) ABSTRACT

An energy-saving valve includes a spool-driving unit which changes the position of a spool to a position at which compressed air is discharged from a first output port without pressure control and includes a pressure control unit which changes the position of the spool to a position at which compressed air is discharged from a second output port in a predetermined pressure level due to pressure control. The pressure control unit includes a pressure control piston, a pressure-receiving surface which enables air pressure in the second output port to act on the pressure control piston, a cylinder chamber, a pressure control channel, and an elastic member which applies biasing force to the pressure control piston in a direction opposite to the action of air pressure on the pressure-receiving surface to determine pressure.

11 Claims, 4 Drawing Sheets

ENERGY-SAVING VALVE

BACKGROUND OF THE INVENTION

1. Field of the Invention

The present invention relates to a valve having a mechanism to enable change between supply and discharge of air, in particular, relates to an energy-saving valve having a decompression mechanism which enables the pressure of compressed air to be reduced and the compressed air to be discharged from a discharging port.

2. Description of the Related Art

In typical air cylinders which have been widely used as pneumatic actuators in various types of automatic machines, a piston having a fixed rod reciprocates in a process in which compressed air is supplied into a pressure chamber and the compressed air is then discharged from the pressure chamber. In general, air is supplied to and discharged from air cylinders by a diverter valve.

In such air cylinders, although a working stroke which contributes to works in the reciprocation of a piston needs large driving force because external loads are imposed on a rod in the working stroke, a return stroke in which the piston returns to the initial position needs driving force smaller than that in a working stroke because external loads are not imposed on the rod. The driving force depends on the magnitude of the pressure of compressed air supplied into a pressure chamber. In view of energy conservation and reduction of the running cost by saving air consumption, the pressure of compressed air supplied into a pressure chamber in a return stroke is preferably smaller than that in a working stroke.

In consideration of such an issue, Japanese Unexamined Patent Application Publication No. 2002-013504 has proposed a technique in which pressure-reducing valves 6 and 125 are provided in a main channel connected to pressure action chambers of a cylinder tube. However, since the pressure-reducing valves 6 and 125 need to be provided in addition to a valve which enables air to be selectively supplied into and discharged from the pressure action chambers of the cylinder tube, equipment becomes complicated and large, which leads to the increase of the initial cost.

The inventors of the present invention have proposed a technique in Japanese Patent Application No. 2010-27943, which imparts a simple structure and small size to a valve which enables the pressure of compressed air supplied into a pressure chamber to be small in a return stroke as compared with a working stroke. However, more simple structures have been demanded.

BRIEF SUMMARY OF THE INVENTION

It is an object of the present invention to provide an energy-saving valve which can save air consumption and impart a simple structure and a small size to equipment with the result that the initial cost and running cost of the equipment can be reduced.

It is another object of the present invention to provide a valve with a more simple structure and a smaller size as compared with the above valve.

In terms of the above objects, an energy-saving valve is provided according to an aspect of the present invention, the energy-saving valve including a main valve body having a first end and a second end as two ends in its axial direction, a valve hole formed so as to penetrate the main valve body in the axial direction, and an air-supplying port, a first output port, a second output port, and air-discharging ports each being in communication with the valve hole; a spool slidably inserted into the valve hole and having channels through which the first output port is in communication with the air-supplying port or one of the air-discharging ports and the second output port is in communication with the air-supplying port or the other one of the air-discharging ports; a spool-driving unit provided to a side of the first end of the main valve body, the spool-driving unit pressing the spool in a direction of the second end to slidably move the spool from a first position at the side of the first end to a second position at a side of the second end; and a pressure control piston attached to the side of the second end of the spool and having a pressure-receiving surface which enables pressure in the second output port to act in the direction of the second end, the pressure control piston receiving biasing force elastically applied by an elastic member in a direction of the first end, wherein in the case where the spool is located at the first position, the first output port is in communication with the one of the air-discharging ports, and the second output port is in communication with the air-supplying port; in the case where the spool is located at the second position, the first output port is in communication with the air-supplying port, and the second output port is in communication with the other one of the air-discharging ports; in the case where supplying compressed air from the air-supplying port to the second output port provides a balance between the biasing force applied to the pressure control piston by the elastic member and the pressure, which acts on the pressure-receiving surface of the pressure control piston, in the second output port, the spool moves to a third position at which the second output port is not in communication with the air-supplying port and the other one of the air-discharging ports; in the case where the pressure, which acts on the pressure-receiving surface, in the second output port is smaller than predetermined pressure given by the biasing the force applied by the elastic member, the spool moves in a direction in which the cross-sectional area of the channel extending from the air-supplying port to the second output port becomes increased; and in the case where the pressure in the second output port is larger than the predetermined pressure, the channel extending from the air-supplying port to the second output port is closed, and the spool moves in a direction to open one of the channels through which the second output port is in communication with the other one of the air-discharging ports.

In a preferred embodiment of the energy-saving valve having the above configuration, the pressure control piston is slidably inserted into a cylinder hole of a second cylinder body in the axial direction, the second cylinder body being provided to the side of the second end of the main valve body, and the cylinder hole being concentric with the valve hole of the main valve body.

A pressure control channel which introduces air pressure in the second output port to the pressure-receiving surface extends inside the spool in the axial direction from an opening facing the one of the annular channesl formed on the circumference of the spool to a cylinder chamber in the cylinder hole, the one of the annular channels being in communication with the second output port, and the cylinder chamber being defined by the pressure-receiving surface.

In another preferred embodiment of the energy-saving valve, the pressure control piston has an elastic member which elastically applies biasing force in the direction of the first end and has an adjuster which adjusts the amount of compression of the elastic member. The adjuster enables the basing force to be changed, or the elastic member which elastically applies biasing force to the pressure control piston can be replaced with another member having a different elastic modulus.

In such an energy-saving valve, the spool-driving unit includes a driving piston slidable in a cylinder hole in the axial direction independently from the spool and includes a pilot solenoid valve configured so as to drive the driving piston, the cylinder hole being formed in a first cylinder body so as to be in communication with the valve hole, the first cylinder body being provided to the side of the first end of the main valve body, wherein the driving piston moves as a result of being pressed by pilot air, so that the spool can be pressed in the direction of the second end.

In the above energy-saving valve according to an aspect of the present invention, a mechanism to reduce the pressure of supplied compressed air in a return stroke which does not require large driving force is integrated with the main valve, which enables energy conservation by saving air consumption and enables simplification and downsizing of equipment. The running cost and initial cost of the equipment can be accordingly reduced.

DETAILED DESCRIPTION OF THE INVENTION

Figure 1:
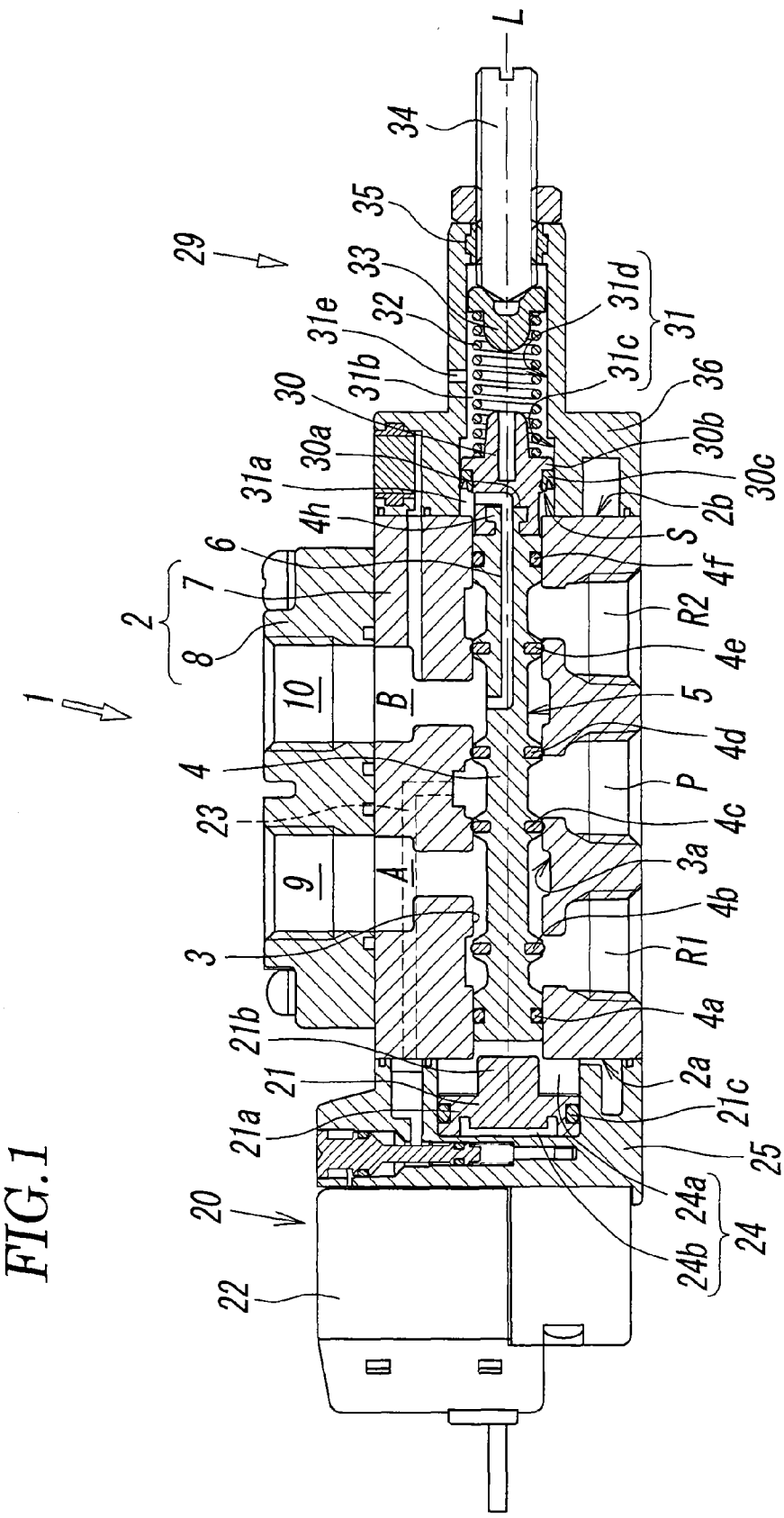
FIG. 1 is a cross-sectional view illustrating the configuration of an energy-saving valve according to an embodiment of the present invention.

FIG. 1 illustrates the configuration of an energy-saving valve of the present invention (hereinafter simply referred to as "valve"). A main valve body 2 of a valve 1 generally includes one valve hole 3 which penetrates the inside of a valve casing 7 of the valve main body 2 so as to extend from a first end 2a to a second end 2b opposite thereto in a direction of an axis L; a series of a first air-discharging port R1, an air-supplying port P, and a second air-discharging port R2 which are provided in sequence from the first end 2a to the second end 2b, each having one end which is in communication with the valve hole 3 and having the other end which opens toward one side (lower surface) of the main vale body 2 in parallel with the valve hole 3; and a first output port A and a second output port B, each having one end which is in communication with the valve hole 3 and having the other end which opens toward the other side (upper surface) of the main valve body 2, and the other side being opposite to the above one side of the main valve body 2 with the valve hole 3 interposed therebetween.

One spool 4 is slidably inserted into the valve hole 3 of the main valve body 2, and the spool 4 has a plurality of annular channels 5 formed on the circumference thereof, the annular channels 5 enabling the air-supplying port P to be in communication with the first output port A or the second output port B or enabling the output ports to be in communication with the first air-discharging port R1 or the second air-discharging port R2. Depending on a slide position of the spool 4, a status is changed such that any one of the first output port A and the second output port B is in communication with the air-supplying port P and such that the other one of these output ports is in communication with the second air-discharging port R2 or the first air-discharging port R1.

Figure 2:
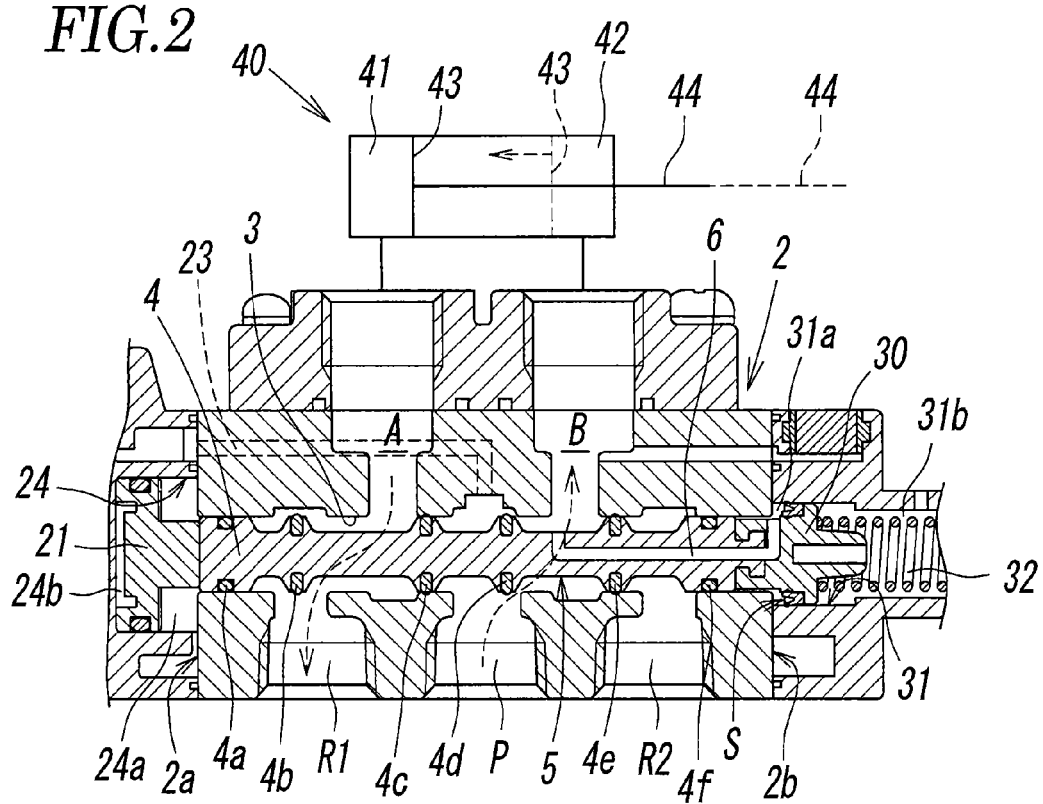
FIG. 2 is a cross-sectional view illustrating the energy-saving valve according to an embodiment of the present invention in a state in which a spool is located at a first position.

A first cylinder body 25 of a spool-driving unit 20 is provided to the first end 2a of the main valve body 2. The first cylinder body 25 has a first cylinder hole 24 that is in communication with the valve hole 3, and pilot air supplied from a pilot solenoid valve 22 drives a driving piston 21 which can slide inside the first cylinder hole 24 that is in communication with the valve hole 3. For example, the driving piston 21 pushes the spool 4 which is located at a first position as illustrated in FIG. 2 in the direction of the second end 2b of the main valve 2, so that the spool 4 moves to a second position illustrated in FIG. 3.

In the case where the spool 4 is located at the first position, the first output port A is in communication with the first air-discharging port R1, and the second output port B is in communication with the air-supplying port P. In the case where the spool 4 is located at the second position, the first output port A is in communication with the air-supplying port P, and the second output port B is in communication with the second air-discharging port R2.

A pressure control unit 29 is provided to the second end 2b of the main valve body 2, and a pressure control piston 30 is connected to an end of the spool 4. The pressure control piston 30 is provided so as to be able to slide inside a second cylinder hole 31 formed in a second cylinder body 36 attached to the second end 2b of the main valve body 2. The second cylinder hole 31 is concentric with the valve hole 3 so as to continue into an end of the valve hole 3 in the direction of the axis L. The pressure control piston 30 has a pressure-receiving surface S which faces the second end 2b of the main valve body 2, and the air pressure in the second output port B acts on the pressure-receiving surface S. The pressure control piston 30 receives biasing force applied by an elastic member 32 in the direction of the first end 2a of the main valve body 2.

The pressure control piston 30 moves the spool 4 forward or backward depending on a difference between the air pressure which acts on the pressure-receiving surface S and the biasing force applied by the elastic member 32 and finally moves the spool 4 to a position which provides a balance between the air pressure and the biasing force. In particular, in the case where air pressure in the second output port B, which acts on the pressure-receiving surface S, is smaller than a predetermined pressure p' given by biasing force applied by the elastic member 32, the pressure control piston 30 moves the spool 4 to a fluid fourth position illustrated in FIG. 5 owing to the biasing force applied by the elastic member 32, the fluid fourth position enabling the channel from the air-supplying port P to the second air-discharging port B to be opened. In the case where the air pressure in the second output port B increases and approaches the predetermined pressure p', the pressure control piston 30 moves the spool 4 in a direction to close the channel from the air-supplying port P to the second output port B. Then, in the case where the air pressure in the second output port B reaches the predetermined pressure p', the spool 4 moves to a third position illustrated in FIG. 4, in other words, a position at which the first output port A is in communication with the first air-discharging port R1 and the second output port B is not in communication with both of the air-supplying port P and the second air-discharging port R2.

The configuration of the valve 1 of the present invention will be specifically described with reference to FIG. 1 without repetition of the above description. The main valve body 2 of the valve 1 includes the valve casing 7 which is penetrated by the valve hole 3 and includes a port-connecting block 8. The first air-discharging port R1, the air-supplying port P, and the second air-discharging port R2 are formed in one side (lower surface) of the valve casing 7. The first output port A and the second output port B are formed in the other side (upper surface) of the valve casing 7. The first output port A is positioned between the first air-discharging port R1 and the air-supplying port P in the direction of the axis L. The second output port B is positioned between the air-supplying port P and the second air-discharging port R2 in the direction of the axis L. The inner surface of the valve hole 3 has annular inner grooves 3a formed so as to individually correspond to the first air-discharging port R1, the first output port A, the air-supplying port P, the second output port B, and the second air-discharging port R2.

The port-connecting block 8 is airtightly fixed to the valve casing 7 by a fixing member, such as a bolt, and has a first port-connecting hole 9 and a second port-connecting hole 10 formed for connection of air piping. The first port-connecting hole 9 is in communication with the first output port A, and the second port-connecting hole 10 is in communication with the second output port B. The first and second output ports A and B can be individually connected to output air piping.

The spool 4 inserted into the valve hole 3 of the valve casing 7 has first to sixth sealing portions 4a to 4f made of elastic materials so as to contact lands formed on the inner surface of the valve hole 3, thereby closing the channels between adjacent ports with the valve hole 3 interposed therebetween and sealing the two ends of the valve hole 3. The spool 4 has the annular channels 5 formed between the individual sealing portions and reducing a diameter of the spool 4. The first sealing portion 4a positioned at the side of the first end 2a of the spool 4 constantly seals a site between the first air-discharging port R1 and the first end 2a of the valve casing 7, and the sixth sealing portion 4f positioned at the side of the second end 2b of the spool 4 constantly seals a site between the second air-discharging port R2 and the second end 2b of the valve casing 7.

The spool 4 has a protrusion 4h formed at the side of the second end 2b thereof and having the enlarged tip which forms a substantially T-shaped cross-section. On the other hand, the pressure control piston 30 has a hollow 30a which opens toward the valve hole 3 with a wide depth to form a substantially T-shaped cross-sectional surface. The protrusion 4h of the spool 4 mates with the hollow 30a of the pressure control piston 30, so that the spool 4 is connected to the pressure control piston 30 at the side of the second end 2b. The pressure control piston 30 and the spool 4 integrally move in the direction of the axis L.

The spool-driving unit 20 provided to the first end 2a of the main valve body 2 includes a first cylinder body 25 airtightly fixed to the end surface of the first end 2a of the valve casing 7; the first cylinder hole 24 formed inside the first cylinder body 25 so as to be coaxial with the valve hole 3 and so as to continue into one end of the valve hole 3, the first cylinder hole 24 having a diameter larger than that of the valve hole 3; the driving piston 21 provided inside the first cylinder hole 24 so as to be able to slide in the direction of the axis L independently from the spool 4; and the pilot solenoid valve 22 which makes the pressure of decompressed air supplied from the air-supply port P act on a side, which is opposite to the valve hole 3, of the driving piston 21 to drive the driving piston 21.

Passage of electric current through the pilot solenoid valve 22 causes the compressed air to function as pilot air entering a second cylinder chamber 24b of the first cylinder hole 24, the compressed air being supplied from the air-supplying port P through an air-supplying channel 23 to the pilot solenoid valve 22. Terminating the passage of electric current causes the compressed air, which has entered the second cylinder chamber 24b, to be discharged to the outside.

The driving piston 21 has a protruding small-diameter portion 21b facing the valve hole 3 and formed so as to fit into the valve hole 3 to push the spool 4. The driving piston 21 further has a large-diameter portion 21a formed at the side opposite to the small-diameter portion 21b so as to fit into the first cylinder hole 24. An elastic annular sealing member 21c is attached to the circumference of the large-diameter portion 21a of the driving piston 21. The large-diameter portion 21a of the driving piston 21 divides the cylinder hole 24 into a first cylinder chamber 24a which faces the valve hole 3 and the second cylinder chamber 24b opposite to the valve hole 3.

The pressure control piston 30 connected to the side of the second end 2b of the spool 4 is inserted into the second cylinder hole 31 formed in the second cylinder body 36 so as to be slidable in the direction of the axis L. The second cylinder hole 31 is provided coaxial with the valve hole 3 and is in communication with an end of the valve hole 3 in line in the direction of the axis L. The second cylinder hole 31 has a large-diameter portion 31c which faces the valve hole 3 and has a small-diameter portion 31d opposite thereto. The small-diameter portion 31d has a hole 31e extending to the outside. The cylinder body 36 is airtightly fixed to the second end 2b of the valve casing 7.

The pressure control piston 30 has an annular protrusion 30b having a diameter smaller than that of the large-diameter portion 31c of the second cylinder hole 31 and larger than that of the small-diameter portion 31d. A lip-shaped sealing member 30c is provided to the valve hole 3-side surface of the annular protrusion 30b. The sealing member 30c divides the inside of the second cylinder hole 31 into the first cylinder chamber 31a and the second cylinder chamber 31b and forms the pressure-receiving surface S which faces the first cylinder chamber 31a. The first cylinder chamber 31a is in communication with the second output port B through the pressure control channel 6. The pressure control channel 6 has an end which opens toward the annular channel 5 formed between the fourth sealing portion 4d and the fifth sealing portion 4e of the spool 4 and has the other end which opens in the outer surface of the pressure control piston 30 in the first cylinder chamber 31a. The pressure control channel 6 extends inside the spool 4 in the direction of the second end 2b in parallel with the axis L while passing through the inside of the protrusion 4h of the spool 4 and the pressure control piston 30 in sequence.

An elastic member (coil spring) 32 for determining pressure is compressively provided between one side of the pressure control piston 30, which is opposite to the side facing the valve hole 3 (pressure-receiving surface S), and a spring bearing 33 in the second cylinder chamber 31b of the second cylinder hole 31, and the elastic member 32 applies biasing force to the pressure control piston 30 in the direction of the first end 2a. The pressure control piston 30 accordingly moves to a position which provides a balance between air pressure in the second output port B and the biasing force applied by the elastic member 32, the air pressure acting on the pressure-receiving surface S. In this case, the biasing force applied by the elastic member 32 becomes balanced with the air pressure in the second output port B, which acts on the pressure-receiving surface S, and therefore equivalent to predetermined pressure p' with respect to pressure output from the second output port B.

In order to adjust the predetermined pressure p', the spring bearing 33 holds an end of the elastic member 32, which is opposite to the pressure control piston 30, and a pressure control screw 34 screwed into the second cylinder body 36 abuts on the outer surface of the spring bearing 33. Thus, the pressure control screw 34 is moved forward or backward to adjust the amount of compression of the elastic member 32, thereby being able to adjust the biasing force applied to the pressure control piston 30 by the elastic member 32, in other words, the predetermined pressure p'.

With reference to FIGS. 2 to 5, the operation of the valve 1 having the above configuration will be specifically described. In examples illustrated in FIGS. 2 to 5, the valve 1 is attached to an air cylinder 40, the first output port A of the valve 1 is connected to a head-side pressure chamber 41 of the air cylinder 40, and the second output port B is connected to a rod-side pressure chamber 42.

FIG. 2 illustrates an initial state in which compressed air is not supplied from an air supply source to the air-supplying port P and the pilot solenoid valve 22 is not active. In this case, since compressed air is not supplied to the air-supplying port P, pressure does not act on the pressure-receiving surface S of the pressure control piston 30. The pressure control piston 30 is pressed by the biasing force applied by the elastic member 32 in the direction in which the first cylinder chamber 31a of the second cylinder hole 31 becomes small with the result that the pressure control piston 30 pushes the spool 4 toward the first end 2a of the main valve body 2. Furthermore, the driving piston 21 in the first cylinder hole 24 abuts on an end face, which is opposite to the valve hole 3, of the first cylinder hole 24.

In this case, since the second sealing portion 4b of the spool 4 separates from a land of the valve hole 3, the first output port A is in communication with the first air-discharging port R1 through the annular channel 5 between the second sealing portion 4b and the third sealing portion 4c. In addition, since the third sealing portion 4c of the spool 4 is on a land of the valve hole 3, the first output port A is isolated from the air-supplying port P. Also in this case, since the fourth sealing portion 4d of the spool 4 separates from a land of the valve hole 3, the second output port B is in communication with the air-supplying port P through the annular channel 5 between the fourth sealing portion 4d and the fifth sealing portion 4e. In addition, although the fifth sealing portion 4e of the spool 4 isolates the second output port B from the second air-discharging port R2, compressed air is not discharged from the second output port B because the compressed air is not supplied through the air-supplying port P.

In the initial state, a piston 43 of the air cylinder 40 is not necessarily located at the initial position at the head-side end of the air cylinder 40, which is indicated by a solid line in FIG. 2. The piston 43 may be positioned at the side of a rod as indicated by a dashed line, and a rod 44 of the piston 43 may be in a protruding state.

Figure 5:
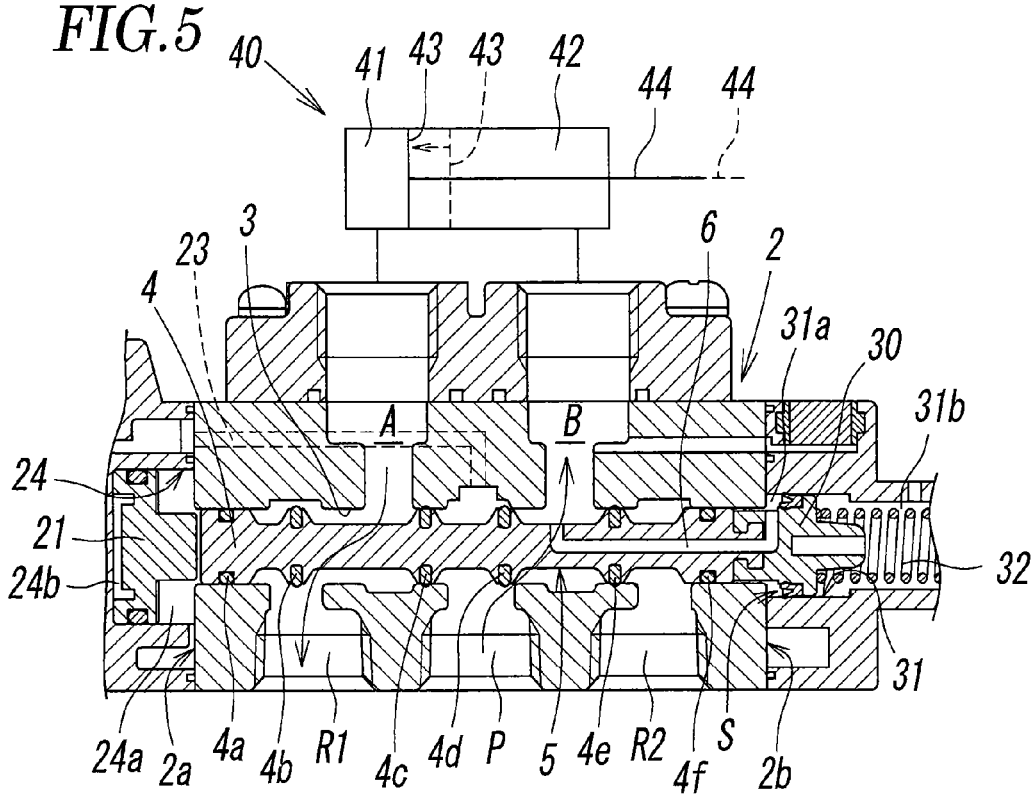
FIG. 5 is a cross-sectional view illustrating the energy-saving valve according to an embodiment of the present invention in a state in which the spool is located at a fourth position.

In the case where an air supply source then starts to supply compressed air of pressure p to the air-supplying port P, the first output port A is still in communication with the first air-discharging port R1 as illustrated in FIG. 5, and the compressed air enters the second output port B through the air-supplying port P, leading to the increase of air pressure in the second output port B. Air therefore enters the first cylinder chamber 31a of the second cylinder hole 31 through the pressure control channel 6 of the spool 4, so that the pressure of the air acts on the pressure-receiving surface S of the pressure control piston 30. The pressure control piston 30 moves so as to separate from the second end 2b of the main valve body 2 to balance the force of the air pressure acting on the pressure-receiving surface S with the biasing force applied by the elastic member 32, and a position of the spool 4 is determined depending on a position of the pressure control piston 30.

The pressure control screw 34 imparts the biasing force to the elastic member 32, and the biasing force is balanced with the predetermined pressure p' in the second output port B.

In the case where air pressure in the second output port B increases and approaches the predetermined pressure p' in a state in which the spool 4 is located at a position illustrated in FIG. 5, since the air pressure is transmitted to the first cylinder chamber 31a of the second cylinder hole 31 through the pressure control channel 6 in the spool 4 and then acts on the pressure-receiving surface S of the pressure control piston 30, the elastic material 32 is compressed by the pressure acting on the pressure-receiving surface S. The spool 4 is accordingly pulled by the pressure control piston 30 and moves in the direction of the second end 2b of the main valve body 2 (right side in the drawing), resulting in the decrease of the cross-sectional area of the channel from the air-supplying port P to the second output port B.

To the contrary, in the case where the air pressure in the second output port B decreases, for example, owing to the increase in the volume of the rod-side pressure chamber 42 as a result of a return operation of the piston 43 of the air cylinder 40 or owing to air leakage, since force of air pressure acting on the pressure-receiving surface S of the air control piston 30 becomes smaller than the biasing force applied by the elastic member 32, the spool 4 moves back in the direction of the first end 2a (left side in the drawing) in the valve hole 3 of the main valve body 2 owing to the biasing force applied by the elastic member 32, leading to the increase in the cross-sectional area of the channel from the air-supplying port P to the second output port B.

The fourth position of the spool 4 illustrated in FIG. 5 depends on the pressure in the second output port B. Even though the spool 4 moves to change the cross-sectional area of the channel from the air-supplying port P to the second output port B, the spool 4 moves depending on the predetermined pressure p' within a range which enables the cross-sectional area to be varied. The spool 4 consequently moves such that the air pressure in the second output port B approaches the predetermined pressure p' given by the elastic member 32. The spool 4 finally moves to the third position illustrated in FIG. 4 in which the first output port A is in communication with the first air-discharging port R1 and in which the second output port B is not in communication with the air-supplying port P and the second air-discharging port R2.

Figure 4:
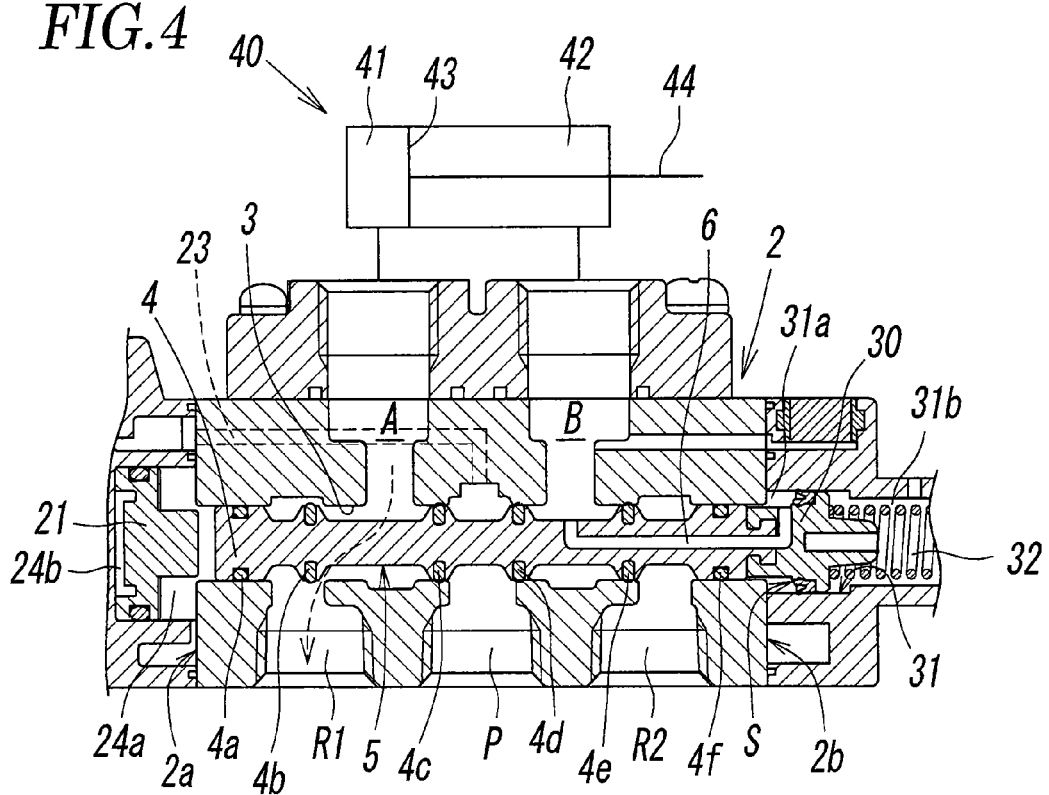
FIG. 4 is a cross-sectional view illustrating the energy-saving valve according to an embodiment of the present invention in a state in which the spool is located at a third position.

In the fourth position of the spool 4 (FIG. 5), as described above, the elastic member 32 keeps the air pressure in the second output port B on or around the predetermined pressure p' given by the elastic member 32, and the spool 4 finally moves to the third position illustrated in FIG. 4. The condition at the fourth position provides the same function as that at the third position.

In the case where the piston 43 of the air cylinder 40 is positioned at the side of the head as indicated by a solid line in FIG. 2, the spool 4 stays at this position. In the case where the piston 43 of the air cylinder 40 is positioned at the side of the rod as indicated by a dashed line in FIG. 2, the spool 4 moves to the initial state at the side of the head as a result of introduction of air to the second output port B.

In the case where the spool 4 is located at the third position, the second output port B is isolated from the air-supplying port P and the second air-discharging port R2 as a result of sealing by the fourth sealing portion 4d and the fifth sealing portion 4e of the spool 4. The pressure in the rod-side pressure chamber 42 of the air cylinder 40, which is connected to the second output port B, is therefore held at a constant level in the predetermined pressure p'. On the other hand, the first output port A is in communication with the first air-discharging port R1, and the head-side pressure chamber 41 connected to the first output port A is still in communication with room air.

As described above, in the air cylinder 40, a return stroke to move a piston back to the initial state is generally free from application of an external load to a rod and therefore needs driving force smaller than that in a working stroke involving application of an external load to the rod. Since the driving force can be appropriately decreased depending on the predetermined pressure p' given by the elastic member 32, air consumption can be saved in a return stroke, leading to energy conservation and reduction of the running cost.

Figure 3:
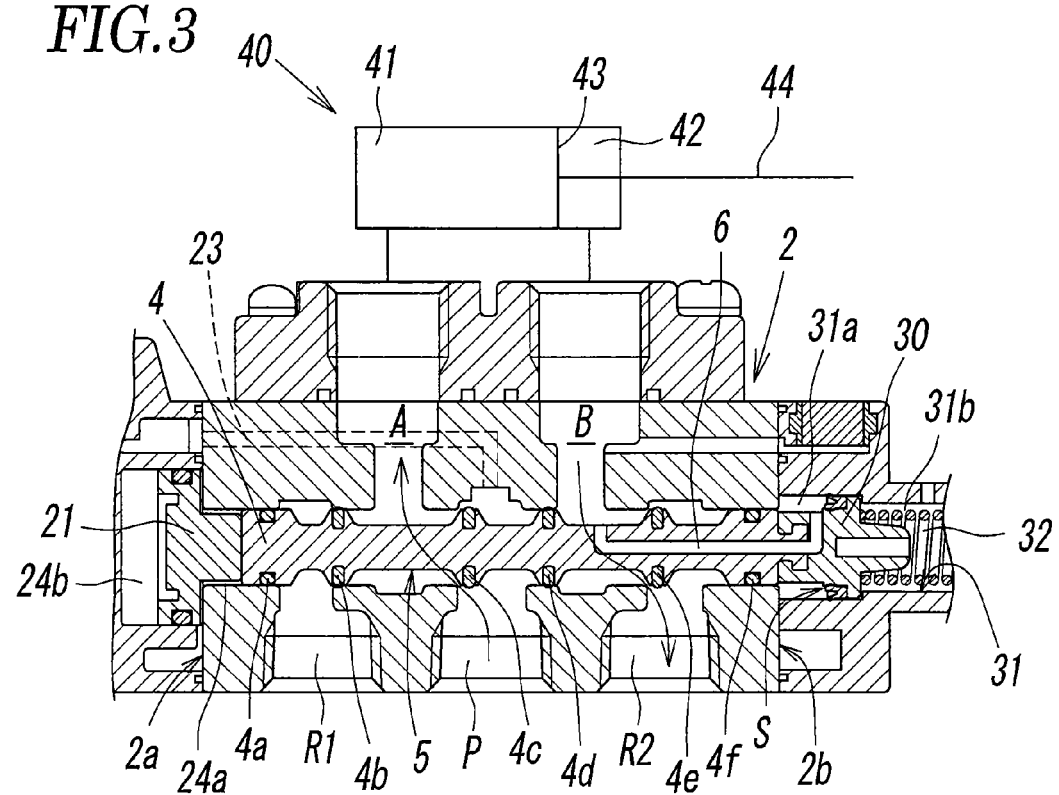
FIG. 3 is a cross-sectional view illustrating the energy-saving valve according to an embodiment of the present invention in a state in which the spool is located at a second position.

In the case of turning on the pilot solenoid valve 22 to move the rod 44 of the air cylinder 40 forward and enter a working stroke to let the rod 44 work, compressed air which has been supplied through the pilot air-supplying channel 23 to the pilot solenoid valve 22 is introduced to the second cylinder chamber 24b of the first cylinder hole 24. The driving piston 21 is driven in a direction in which the spool 4 is pushed as illustrated in FIG. 3 and pushes the spool 4 in the direction of the second end 2b of the main valve body 2, so that the spool 4 slides to a position illustrated in FIG. 3. In this case, the driving force of compressed air introduced into the second cylinder chamber 24b to press the driving piston 21 is sufficiently larger than biasing force applied by the elastic member 32 in the direction of the first end 2a, which enables the driving piston 21 to be driven until the large-diameter portion 21a of the driving piston 21 abuts on the end surface of the first end 2a of the main valve body 2. The spool 4 then shifts to the second position illustrated in FIG. 3.

In the case where the spool 4 moves to the second position, since the third sealing portion 4c of the spool 4 separates from a land, the first output port A is in communication with the air-supplying port P through the annular channel 5 between the second sealing portion 4b and the third sealing portion 4c and is isolated from the first air-discharging port R1 as a result of sealing by the second sealing portion 4b. In addition, since the fifth sealing portion 4e separates from a land, the second output port B is in communication with the second air-discharging port R2 through the annular channel 5 between the fourth sealing portion 4d and the fifth sealing portion 4e, and the fourth sealing portion 4d isolates the second output port B from the air-supplying port P.

Thus, compressed air supplied from an air supply source in pressure p is transmitted from the air-supplying port P through the first output port A to the head-side pressure chamber 41 of the air cylinder 40 without pressure control, and compressed air in the rod-side pressure chamber 42 is discharged from the second air-discharging port R2 to room air. Consequently, the piston 44 of the air cylinder 40 is driven in the direction of the rod-side pressure chamber 42 while the rod 44 carries out an intended work in a working stroke.

In the working stroke, although an external load acts on the rod 44, compressed air of sufficiently large pressure p is supplied to the head-side pressure chamber 41, so that sufficient driving force can be imparted to the piston 43 in response to the external load while the responsiveness of the working stroke can be secured.

After the rod 44 has moved forward while working in a working stroke, the rod 44 enters a return stroke in which the rod 44 moves backward to the initial position. In this case, the pilot solenoid valve 22 is turned off to form a communication between the second cylinder chamber 24b of the first cylinder hole 24 and room air. The biasing force applied by the elastic member 32 to act on the pressure control piston 30 then functions to push and slide the spool 4 and the driving piston 21 in the direction of the first end 2a, and the spool 4 moves to the first position illustrated in FIG. 2. Hence, compressed air of the predetermined pressure p' is supplied from the air-supplying port P through the second output port B to the rod-side pressure chamber 42 of the air cylinder 40, and the head-side pressure chamber 41 is in communication with room air through the first output port A and the first air-discharging port R1. The piston 43 accordingly moves back from the state indicated by a dashed line to the state indicated by a solid line.

Then, in the cases where the pressure in the second output port B increases as a result of supplying compressed air to the second output port B and where the air pressure which acts on the pressure-receiving surface S of the pressure control piston 30 through the pressure control channel 6 then increases, the pressure control piston 30 shifts from a position at which the pressure acting on the pressure-receiving surface S is balanced with biasing force applied by the elastic member 32 to the fourth position illustrated in FIG. 5 as described above and finally shifts to the third position illustrated in FIG. 4.

As described above, in the valve 1, since air pressure in the second output port B acts on the pressure control piston 30 with the result that a position of the spool 4 is changed depending on the air pressure in the second output port B, pressure transmitted to the rod-side pressure chamber 42 can be reduced in a return stroke to save air consumption. The mechanism to reduce pressure is integrated with a main valve, which enables both energy conservation and simplification and downsizing of equipment with the result that the running cost and initial cost of the equipment can be reduced.

Figure 6:
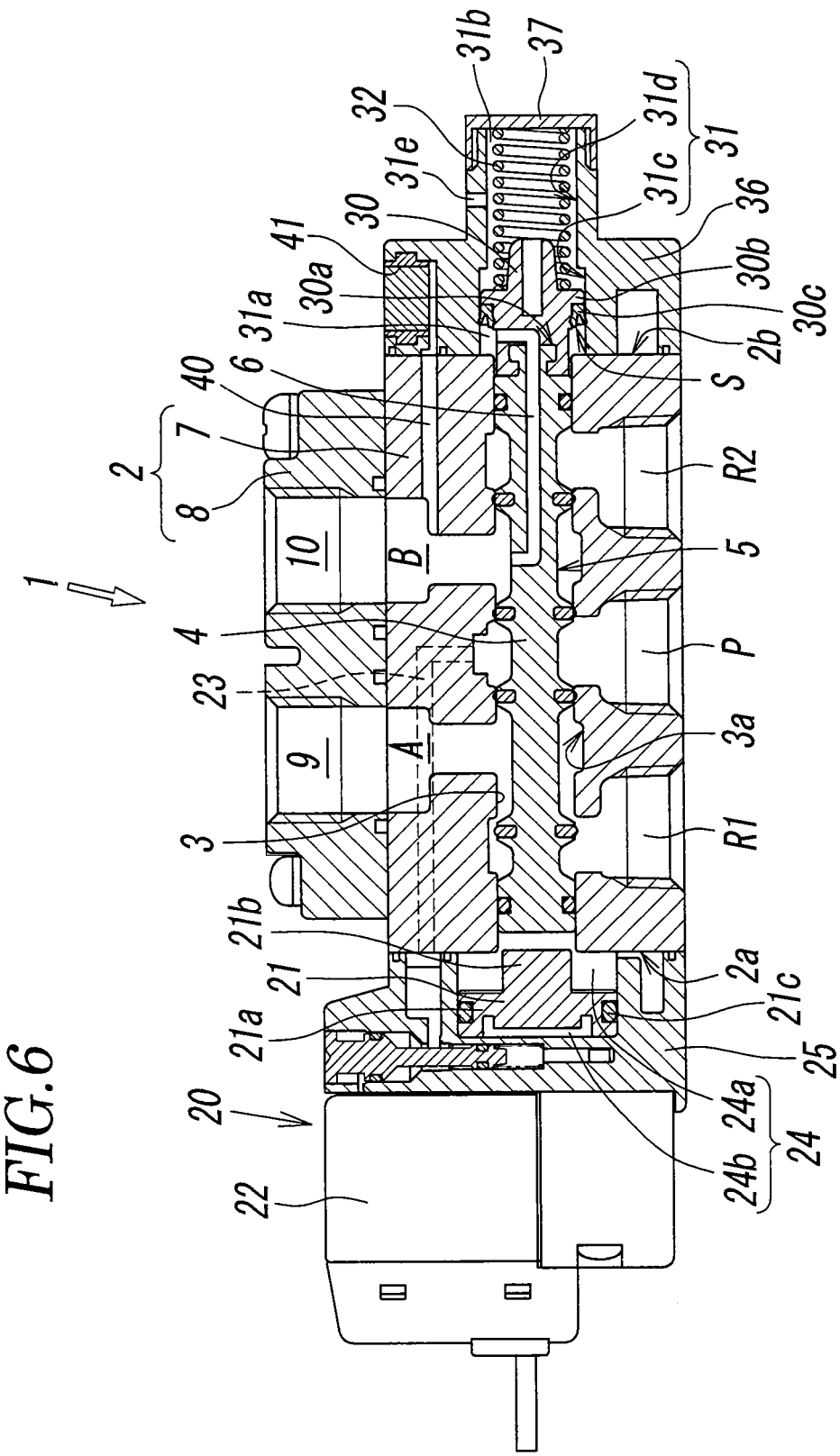
FIG. 6 is a cross-sectional view illustrating an energy-saving valve according to another embodiment of the present invention in which an elastic member can be replaced.

FIG. 6 illustrates another embodiment of the valve 1 of the present invention. In this embodiment, the elastic member 32 which applies biasing force to the pressure control piston 30 in the direction of the first end 2a can be replaced with another elastic member 32 having a different elastic modulus. In particular, a cap-shaped lid member 37 is removably screwed into an end of the second cylinder body 36. In the case of replacing the elastic member 32 with another elastic member 32 having a different elastic modulus, the lid member 37 is removed from the second cylinder body 36, and the elastic member 32 is replaced with another one having an elastic modulus to properly give the predetermined pressure p'. Since the other configurations of the valve 1 in FIG. 6 are substantially the same as those of the valve 1 in FIG. 1, the same or corresponding portions are denoted by the same reference symbols to avoid repetition in description thereof.

Although embodiments of the present invention have been specifically described, the present invention can be variously modified without departing from the scope of the present invention.

The invention claimed is:
1. An energy-saving valve comprising:
a main valve body including a first end and a second end as two ends in a direction of an axis, a valve hole extending in the direction of the axis, and an air-supplying port, a first output port, a second output port, and air-discharging ports each being in communication with the valve hole;

a spool slidably inserted into the valve hole and including channels through which the first output port is in communication with the air-supplying port or the air-discharging port and the second output port is in communication with the air-supplying port or the air-discharging port;

a spool-driving unit provided to a side of the first end of the main valve body, the spool-driving unit pushing the spool in a direction of the second end to slidably move the spool from a first position at the side of the first end to a second position at a side of the second end; and a pressure control piston attached to the side of the second end of the spool and having a pressure-receiving surface which enables pressure in the second output port to act in the direction of the second end, the pressure control piston receiving biasing force elastically applied by an elastic member in a direction of the first end, wherein in the case where the spool is located at the first position, the first output port is in communication with the air-discharging port, the second output port is in communication with the air-supplying port, supplying compressed air from the air-supply port to the second output port causes the spool to move so as to provide a balance between the biasing force applied by the elastic member to act on the pressure control piston and air pressure in the second output port, the air pressure acting on the pressure-receiving surface of the pressure control piston, and a balance between the biasing force applied by the elastic member and the air pressure acting on the pressure-receiving surface enables the spool to be located at a third position at which the second output port is not in communication with the air-supplying port and the air-discharging port, and in the case where the spool is located at the second position, the first output port is in communication with the air-supplying port, and the second output port is in communication with the air-discharging port.

2. The energy-saving valve according to claim 1, wherein the pressure control piston is slidably inserted into a cylinder hole of a second cylinder body in the direction of the axis, the second cylinder body being provided to the side of the second end of the main valve body, and the cylinder hole being concentric with the valve hole of the main valve body.

3. The energy-saving valve according to claim 2, wherein a pressure control channel which introduces the air pressure in the second output port to the pressure-receiving surface extends inside the spool in the direction of the axis from an opening facing one of the annular channels to a cylinder chamber in the cylinder hole, the one of the annular channels being formed on the circumference of the spool and being in communication with the second output port, and the cylinder chamber being defined by the pressure-receiving surface.

4. The energy-saving valve according to any one of claims 1 to 3, further comprising an adjuster to adjust the amount of compression of the elastic member, the adjuster enabling the biasing force to be changed.

5. The energy-saving valve according to any one of claims 1 to 3, wherein the elastic member is replaceable with another member having a different elastic modulus.

6. The energy-saving valve according to any one of claims 1 to 3, wherein the spool-driving unit includes a driving piston slidable in a cylinder hole in the direction of the axis independently from the spool and includes a pilot solenoid valve configured so as to drive the driving piston, the cylinder hole being formed in a first cylinder body in communication with the valve hole, and the first cylinder body being provided to the side of the first end of the main valve, wherein the driving piston moves as a result of being pressed by pilot air, so that the spool is pressed in the direction of the second end.

7. The energy-saving valve according to claim 1, further comprising a pressure control channel introducing the air pressure in the second output port to the pressure-receiving surface of the pressure control piston, wherein the spool-driving unit includes a driving piston arranged at a side of the first end of the main valve body slidably in the direction of the axis and independently from the spool, a first cylinder chamber and a second cylinder chamber formed at one side and the other side of the driving piston respectively, and a pilot solenoid valve for driving the driving piston, the first cylinder chamber between the driving piston and the spool is in communication with air, and the driving piston is pressed and moved by the pilot air which is supplied to the second cylinder chamber using the pilot solenoid valve, so that the spool-driving unit is formed so as to press the spool in the direction of the second end.

8. An energy-saving valve comprising:

a main valve body including a first output port, a second output port, an air-supplying port, air-discharging ports, a valve hole which is in communication with the respective ports, and a spool which slides inside the valve hole in the direction of the axis to change communication of channels to be formed between the ports;

a spool-driving unit which is provided to a side of one end of the main valve body and changes the position of the spool to a position at which compressed air is discharged from the first output port without pressure control; and a pressure control unit which is provided to a side of the other end of the main valve body and changes the position of the spool to a position at which compressed air is discharged from the second output port in a predetermined pressure level due to pressure control, wherein the spool-driving unit includes a driving-piston provided to the side of one end of the spool and includes a pilot solenoid valve which supplies pilot air to the driving piston, and the pressure control unit includes a pressure control piston provided to the side of the other end of the spool so as to be integrated with the spool, a pressure-receiving surface which enables air pressure in the second output port to act on the pressure control piston, a cylinder chamber facing the pressure-receiving surface, a pressure control channel which enables the cylinder chamber to be in communication with the second output port, and an elastic member which applies biasing force to the pressure control piston in a direction opposite to the action of air pressure on the pressure-receiving surface to determine pressure.

9. The energy-saving valve according to claim 8, wherein the pressure control piston is provided aside from the spool and is integrally connected to an end of the spool.

10. The energy-saving valve according to claim 8, wherein the pressure control channel is formed inside the spool and the pressure control piston, one end of the pressure control channel opens in a side surface of the spool at a position corresponding to the second output port, and the other end of the pressure control channel opens in a side surface of the pressure control piston in the cylinder chamber.

11. The energy-saving valve according to claim 8, wherein the driving-piston is arranged to freely contact with, and separate from, the spool, and the pilot solenoid valve supplies pilot air to the second cylinder chamber of one side of the driving piston, and the first cylinder chamber between the other side of the driving piston and the spool is in communication with air.

\* \* \* \* \*